US005635252A

United States Patent [19]

Fraser, Jr. et al.

[11] Patent Number: 5,635,252

[45] Date of Patent: Jun. 3, 1997

[54] CONDUCTIVE FABRIC CONDUCTIVE RESIN BODIES AND PROCESSES FOR MAKING SAME

[75] Inventors: Ladson L. Fraser, Jr., High Point; Richard L. Vockel, Oak Ridge, both of N.C.

[73] Assignee: Precision Fabrics Group, Inc., Greensboro, N.C.

[21] Appl. No.: 524,434

[22] Filed: Sep. 6, 1995

Related U.S. Application Data

[63] Continuation-in-part of Ser. No. 303,521, Sep. 9, 1994.

[51] Int. Cl.$^{6}$ .............................. B05D 1/18; C04B 35/00

[52] U.S. Cl. .................................... 427/430.1; 427/407.1; 427/407.3; 264/105; 264/136; 264/137; 264/257; 264/258; 264/297.2

[58] Field of Search .............................. 427/430.1, 407.1, 427/407.3; 264/105, 136, 137, 257, 258, 297.2; 428/224, 225, 237, 240, 244, 245, 283, 288, 289, 290; 156/67, 166, 169, 180, 242, 307.3

[56] References Cited

U.S. PATENT DOCUMENTS 4,239,794 12/1980 Allard .
4,435,465 3/1984 Ebneth .
4,471,015 9/1984 Ebneth .
4,472,474 9/1984 Grosheim et al. .
4,534,886 8/1985 Kraus .
4,540,624 9/1985 Cannady, Jr. .
4,684,762 8/1987 Gladfelter .
4,689,098 8/1987 Gaughan .
4,722,860 2/1988 Doljack et al. .
4,840,840 6/1989 Flynn .
4,865,892 9/1989 Winfield .
4,869,951 9/1989 McCullough, Jr. et al. .
4,889,764 12/1989 Chenoweth et al. .
4,902,562 2/1990 Bahia .
4,973,514 11/1990 Gamble et al. .
5,021,297 6/1991 Rhue et al. .
5,035,942 7/1991 Nagata .
5,083,650 1/1992 Seiz et al. .
5,098,771 3/1992 Friend .
5,185,381 2/1993 Ruffoni .
5,272,000 12/1993 Chenoweth et al. .
5,284,701 2/1994 Hamon .
5,289,311 2/1994 Bentson et al. .

*Primary Examiner*—Diana Dudash
*Assistant Examiner*—David M. Maiorana
*Attorney, Agent, or Firm*—Finnegan, Henderson, Farabow, Garrett & Dunner

[57] ABSTRACT

A process is disclosed for forming a flexible, electrically conductive fabric by applying to a nonconductive flexible fibrous web substrate an aqueous solution comprising a conductive material and a binder, saturating the web with the aqueous solution, and drying and curing the web. Another process is disclosed for altering the chemical or physical properties of a resin during a production process comprising the steps of treating a fabric with an aqueous solution containing a conductive material, a binder and a resin-affecting compound; applying the treated fabric to a resin and causing the resin-affecting compound to leach from the fabric into the resin; forming an article from the fabric and the resin, and curing the article. A further process is disclosed for treating the fabric by dipping the fabric in an aqueous solution containing a conductive material, a binder, and a resin-affecting compound; nipping the fabric; and drying the fabric.

18 Claims, No Drawings

CONDUCTIVE FABRIC CONDUCTIVE RESIN BODIES AND PROCESSES FOR MAKING SAME

This application is a continuation-in-part of application Ser. No. 08/303,521, filed Sep. 9, 1994.

FIELD OF THE INVENTION

This invention relates to a process for applying a conductive coating to a nonconductive substrate to render the substrate electrically conductive. More particularly, the invention relates to the production of a conductive fabric or veil.

This invention further relates to a process for altering the chemical or physical properties of a resin body during production of a resin part having a conductive veil by applying a conductive veil containing a resin affecting compound to a surface of the resin during the production process. In another aspect, this invention relates to a process for accelerating the cure rate of a resin body during fabrication of a reinforced resin article including a conductive fabric or veil.

BACKGROUND OF THE INVENTION

The need exists in a wide variety of industries for electrically conductive materials which can provide an object with a conductive surface or a conductive internal layer. A material capable of electrostatic dissipation, for instance, is desired for use in such disparate products as carpet backing, furniture intended for computer or electronics use, flammable chemical storage tanks, filtration media, and electrical component packaging. Thin conductive substrates also serve as diagnostic layers in composites or storage tanks, and may be used in products utilizing resistance heating, such as pipe wrapping, food warmers, or heated socks and gloves. And these materials see great use for electromagnetic interference (EMI) shielding in electronics cabinets, cable and wire shielding, and various aspects of the defense and aerospace industries.

While conductive materials have long been sought for these numerous applications, their use has been limited by cost and workability. Clearly, items such as carpet, computer furniture, and heated socks and gloves cannot utilize conductive layers when the production or incorporation costs of the layers push the price beyond reasonable limits. Thus, inexpensive, highly-workable conductive materials are strongly desired. Unfortunately, the materials currently in use are expensive to produce, difficult to work with, or both expensive and unworkable. For instance, graphite fibers and fabrics are expensive, have low flexibility, encounter dust and contamination problems, and are difficult to incorporate in structural materials.

Carbonized paper has a low permeability for any desired resins, is expensive, and has low flexibility and tensile/tear strength. Metal screens and fibers are expensive, have low flexibility, are difficult to work with, and react with resins. Conductive paints and lacquers are also expensive, require surface preparation of the material to be covered in addition to post-application drying and curing steps, may be difficult to apply, and are disfavored due to overspraying, waste, and the emission of volatile organic compounds. Vacuum metallized substrates also suffer from high cost and additionally degrade when a resin is employed. Carbon-polymer composites formed of extruded carbon fibers sheathed or cored with fabrics such as nylon or PET offer good properties but are expensive to produce. Synthetic metal-salt dyed fibers similarly suffer from a high cost.

Thus, the need still exists for a low-cost, workable conductive material which can provide a conductive layer to a wide variety of products.

One product of interest is in the area of reinforced resin parts having conductive properties. Fiberglass reinforced plastic (FRP) structural parts have been successfully used in various applications where the part is subjected to corrosive decay, decomposition, rust, and degradation, such as in chemical plants, paper mills, and plating facilities.

FRP parts or articles can be made by a number of processes, including, but not limited to, the following processes. They typically involve one of three types of cures—room temperature, elevated temperature, or ultraviolet ("UV").

Contact molding or open molding is an FRP process utilizing a room temperature cure. Resins and reinforcements are manually (hand lay-up) or mechanically (spray-up) deposited on an open mold surface. The mold surface is preferably previously coated with a gel coat and is provided with a surfacing fabric such as a mat or veil. Once the required amounts of reinforcements and resin have been deposited on the mold, the laminate is worked with rollers, brushes or squeegees, usually manually, to remove any trapped air and thoroughly saturate or wet-out the reinforcements with resin. Once this is completed, the laminate is allowed to cure at room temperature.

Resin transfer molding (RTM) and structural reaction injunction molding (S-RIM) are two similar closed mold FRP processes in which the required reinforcement package, including a surfacing fabric such as a mat or veil, is placed on one-half of the mold cavity, usually the bottom half. Once properly positioned, the top half of the mold is closed on the bottom half and secured in place. Next, the resin is injected slowly under minimal (e.g., 50 psi) pressure in RTM or rapidly under high pressure (e.g., 2000 psi) in S-RIM. The mechanical pumping and resulting pressure cause the air to be flushed out of the mold cavity and the resin to saturated or wet-out the reinforcement. The resin impregnated reinforced article is then allowed to cure at room temperature.

Compression molding is another FRP molding process. In this process, the reinforcement package including surfacing fabric (mat or veil) and the resin are placed on one-half, usually the bottom half, of the mold cavity. Once properly positioned, the top half of the mold is mechanically closed on the bottom half using a press which compresses the reinforcement package and resin under pressure (from 50 to 1500 psi) to flush out the air and thoroughly saturate or wet-out the reinforcement package with resin. It is then cured normally with the assistance of heat, i.e., elevated temperature cure.

Filament winding is an FRP process in which reinforcements, normally continuous rovings, are saturated with resin, normally by pulling them through a pan or bath containing the resin. The reinforcements are then wound on a rotating mandrel in a specific pattern. The mandrel may or may not have been previously covered with a resin impregnated surfacing fabric. One or more outer layers of surfacing fabric may be wrapped over the resin impregnated reinforcement when required. Once the required amount of resin, reinforcements and surfacing fabrics are properly placed on the mandrel, the laminate is allowed to cure either with or without the assistance of heat.

The continuous panel process is an FRP process for making continuous flat and/or shaped, e.g. corrugated, panels. It involves depositing a resin on a carrier film which then passes under a reinforcement deposition area. Various types of reinforcement are then applied to the film or resin. The reinforcement and resin then go through a compaction section where a series of belts, screens, or rollers force air out and thoroughly saturate or wet-out the reinforcement with resin. A surfacing fabric such as a mat or veil may be placed on either the top or bottom surface of the resulting saturated material and the fabric is allowed to be saturated with resin. A carrier film is then applied to the top surface of the resulting article which is passed through a curing station where the resin is normally cured with the assistance of heat. Once cured, the carrier film is removed and the article is cut to the desired length.

Pultrusion is a process for fabricating a reinforced resin product, such as a fiber reinforced plastic (FRP) article. It involves taking various forms of fiber reinforcements (mats, woven products, continuous rovings, etc.) made of materials such as fiberglass, carbon, aramid, etc. which are saturated or wet-out with an uncured thermoset resin. Normally, a polyester resin is used, but it can also be epoxy, phenolic or other resins. These saturated reinforcements are then pulled through a heated, matched metal die or mold machined to the shape of the desired finished part. While in the die or mold, the time and temperature relationship of the die or mold to the resin formulation transforms the resin from a liquid to a solid. This transformation is known as curing, cross-linking or polymerization. During this transformation, exothermic energy is generated in the chemical reaction.

In the pultrusion process, the amount and type of reinforcement needed to obtain the desired product is first determined. The reinforcement is put in the proper position and held in that position so that a uniform distribution of reinforcement in the resin is achieved. This is accomplished by using the proper amount of tension on the reinforcement along with guiding the reinforcement. If the reinforcement is not uniformly distributed throughout the cross-section of the resin, the finished product could possess areas of structural weakness.

Next, the reinforcements must be saturated or wet-out with a resin in, e.g., the resin tank. Preferably, all of the reinforcements must be wet-out to insure that a quality product is obtained. Viscosity, residence time, and mechanical action are all variables which influence the wet-out process. Without uniform and adequate wet-out, certain areas of the product may be structurally deficient.

Preformers can be used to manipulate the combination of reinforcement and resin in order to reduce die wear and insure uniformity. The combination of reinforcement and resin is then pulled through heated steel dies. Curing occurs during this step of the pultrusion process. Die temperature, pull speed, and the type of catalysts and cure promoter are all variables which control the rate of curing during formation of the product in the dies. The pull speed remains constant during the pultrusion process. Different shapes will require different speed settings.

The finished pultrusion product is then cut to the desired size. The resulting product possesses outstanding strength to weight ratio.

A publication of Fiberglass Canada, Inc. entitled "An Introduction to Fiberglass-Reinforced Plastics/Composites" provides a detailed overview of FRP production. The teachings of this publication are hereby incorporated by reference into this application.

Resin reactivity in FRP processes is controlled by a wide variety of properties. The base resin, as supplied by the resin manufacturer, will vary in reactivity based on formulation, viscosity, temperature in storage, age, etc. The curing of a resin is based on cross-linking the individual molecules to form long chain molecules. Cross-linking can be achieved by the use of a catalyst and/or heat. The rate of cross-linking is determined by how fast the catalyst disassociates into free radicals of active oxygen, which initiate the cross-linking.

The catalyst's rate of disassociation into free radicals can be controlled by heat and/or cure promoters. Hot-molding processes often do not require a promoter due to the high temperatures. It is known in the art to reduce curing time and/or heating requirements for the manufacture of resin materials by adding a promoter to the resin and curing agent. More heat and/or promoter results in more free radicals, faster cross-linking, faster cure and higher exotherm temperatures. This produces faster cure and faster line speeds. Too high an exotherm temperature, however, causes the finished part to be structurally weaker.

However, the graphite or carbon additives that can provide conductivity to a fabric or veil, and thus to the composite matrix, tend to inhibit cure due to the high surface activity of carbon (especially activated carbon). This is particularly the case for room temperature cures. Powders and dispersions of carbon are known to inhibit room temperature resin cure systems where free radical initiators such as benzyl peroxide, methyl ethyl ketone peroxide are employed. This is true for resins in general and for vinyl ester resins, in particular. The carbon absorbs the free radical, thereby negating its cross-linking effect on the composite matrix.

Thus, it is necessary to address the need for fast and efficient curing, especially at room temperature, of a molded resin body which has a conductive fabric or veil.

SUMMARY OF TEE INVENTION

The present invention has been made in view of the above circumstances and comprises a process for forming a flexible, electrically conductive fabric by applying to a nonconductive flexible fibrous web substrate an aqueous solution comprising a conductive material and a binder, saturating the web with the aqueous solution, and drying and curing the resultant fabric.

The process forms a relatively inexpensive, highly workable conductive fabric which retains most of the properties of the flexible base substrate and can therefore easily be put to use in a variety of applications. The fabric generally exhibits an ASTM D-257-93 surface resistivity from 1.0 to $1.0\times10^{10}$ ohms per square, preferably from 1.0 to $1.0\times10^{6}$ ohms per square. The resistivity can be adjusted within this range by altering the ratio of substrate material to conductive material, adding further materials to the aqueous solution, including resin affecting compositions, nipping the substrate to a certain amount of coating add-on, or calendering or otherwise dry finishing the substrate. Further additives may be used in the conductive coating solution to control rheology, viscosity, or polymer or filler content in order to meet certain end use requirements of the fabric.

The invention further comprises a process for altering the chemical or physical properties of a resin during a production process comprising the steps of: (a) treating a fabric with a conductive material, a binder and a resin-affecting compound; (b) applying the treated fabric to a block of resin and causing the resin affecting compound to leach from the fabric into the resin; (c) forming an article from the fabric and the resin; and (d) curing the article.

The present invention further relates to a process wherein the fabric is treated by (1) dipping the fabric in an aqueous solution containing a conductive material, a binder and a resin-affecting compound; (2) nipping the fabric; and (3) drying the fabric.

The FRP processes in which the claimed invention may be of use include contact molding, open molding, resin transfer molding, reaction injection molding, compression molding, continuous panel processes, and pultrusion. It is particularly useful in contact molding, open molding, resin transfer molding, and reaction injection molding, all of which use a room temperature cure.

In a further embodiment of the present invention, a previously-formed conductive fabric or veil is treated with a resin-affecting compound selected from a cure promoter, a mold release agent, and a UV stabilizer. The solution containing the resin-affecting agent may be applied to the fabric by any of the following methods: (a) froth finishing (foam coating), (b) foam coating—stabilized system, (c) coating of a thickened paste with knife, screen, or gravure applicator, (d) printing of a thickened paste, (e) vacuum extraction—low wet pick-up finishing system, (f) steam box application, (g) spray finishing—low wet pick-up, (h) horizontal pad, (i) kiss roll applicator, or similar technique. The treated fabric is then dried. Drying can be accomplished by: (a) cans (steam), (b) Palmer Unit (steam), (c) pin tenter curing oven (forced air), (d) clip curing oven (forced air), (e) infrared drying oven (calrod or gas), (f) through fabric drum dryer, (g) conveyor ovens, or similar technique.

Polyester (or other base products such as glass, nylon, etc.) fabrics used in fiber reinforced plastic processes can cause the surface of an FRP article to be "resin rich." That is, the makeup on the surface of a veiled FRP article possessing a treated fabric on its surface, is about 90% resin (or resin mixture) and about 10% reinforcement by weight. The composition below the surface of treated veiled article or on the surface of a nonveiled article would range from 70% resin (or resin mix) and 30% reinforcement, to 30% resin and 70% reinforcement (other than some small amounts of binder resin for dimensional stability in some but not all veiled articles).

Resins useful in the present invention include polyester resin, epoxy resin, vinyl ester resin, and phenolic resin.

When the resin-affecting compound is a cure promoter, the present invention overcomes the problems and disadvantages of the prior art by accelerating the cure rate of a resin at the fabric-resin interface during the production of a reinforced resin product such as an FRP article.

In the manufacture of FRP parts, the speed of the production process is often affected by the rate of cure of the resin system on the surface in contact with the mold. To increase the rate of cure normally involves increasing the levels of various catalysts used to cure the resins. This normally increases the peak exotherm temperature of the resin matrix of the entire resulting part, which can have a detrimental effect in the form of cracking, blistering, warpage, etc.

In an embodiment of the present invention, a conductive fabric is treated with a cure promoter, such as an organometallic complex, and the fabric is then applied to a resin. During fabrication, the promoter treated fabric causes the resin in contact with the fabric to achieve increased promotion or faster cure. This will speed up the cure primarily in that portion of the resin adjacent to, i.e., in contact with, the fabric. Therefore, only this fabric-resin interface (approximately 0.010 to 0.015 in.) sees the extra promotion, faster disassociation of the catalyst (already mixed in the resin) and higher exotherm.

The concept of applying a conductive fabric treated with a cure promoter to a resin during the production of a fiber reinforced plastic article could lead to a variety of benefits in the fabrication of FRP parts. These include, but are not limited to, increased production rates, reduced production costs, improved corrosion resistance, improved weatherability, improved durability, and reduced defects such as blistering, porosity, cracking, etc.

The cure promoter is particularly important when a carbon-filled conductive fabric is utilized. The high surface activity of carbon entraps the free radicals which are essential to cross-linking, thereby resulting in an inhibited cure, especially at room temperature. Where such conductive fabrics are utilized, it has been found that the addition of a cure promoter, such as a heavy metal compound which reacts with compounds supplying free radicals, to the conductive coating promotes the cure significantly, compared to a system without such a cure promoter (i.e., "nonpromoted"). Cobaltous compounds such as cobalt nitrate are particularly preferred. In vinyl ester resins, in particular, the cure is inhibited when a non-promoted fabric is used, and accelerated when a fabric containing a cure promoter is used.

The present invention also facilitates the release of FRP articles from molds by reducing the pulling force necessary to pull the materials through the mold during fabrication of a reinforced resin article. Fabric treated with a mold release agent according to the present invention increases the lubrication at the surface of the mold, further reducing adhesion between the resin being molded and the mold. As occurs with the cure promoter, the mold release agent leaches from the treated fabric into the resin permeating and surrounding the treated fabric, thereby increasing lubricity and reducing the pulling force necessary to open the mold. The invention may therefore eliminate the need to add a mold release agent directly to the resin. In theory, this could lead to improved strengths of the resulting parts.

The concept of applying a fabric treated with a mold release agent to a resin during the production of a fiber reinforced plastic article could lead to a variety of benefits in the fabrication of FRP parts. These include but are not limited to, lower cost (since the mold release agent is only applied to the area that is in contact with the mold), reduced production surface defects such as scaling, flaking and porosity (since a higher level of internal mold release could be concentrated in the area that is in contact with the mold), and improved part strength (since the mold release agent would only be on the surface of the article and not in the internal area of the article, where the mold release agent would act to reduce the fiberglass-resin bond). The present invention also relates to products produced by the processes described above.

These and other features and advantages of the present invention will be made more apparent from the following description of the preferred embodiments or may be learned by practice of the invention.

DESCRIPTION OF THE PREFERRED EMBODIMENTS

According to a preferred embodiment of the present invention, a nonconductive fibrous web substrate is dipped into an aqueous solution containing a conductive material and a binder, saturated with the solution, nipped to a predetermined wet add-on, and dried and cured to form a flexible, electrically conductive fabric. This aqueous-based treatment is applied using standard textile wet processing methods, and drying and curing are similarly performed by conventional means.

The nonconductive fibrous web substrate of the present invention can be any flexible fabric. It can be woven, nonwoven, knit, or paper, and may be natural, synthetic, or a blend. Preferably, however, the substrate is a nonwoven. Fabrics which can be used in the present invention include polyester fabric, nylon spunbond fabric, glass fabric, aramid fabric, and rayon fabric. The preferred fabrics are spunlaced apertured and non-apertured polyester fabrics and spunbonded nonapertured polyester fabric.

The conductive material may similarly be any material capable of providing conductivity to a nonconductive substrate. Examples include carbon black (e.g., KW3729 conductive carbon black by Heucotech Ltd.), jet black or lamp black, carbonized acrylonitrile black, dry powdered carbon (e.g., Conductex® 975 by Columbian Chemical), tin-doped antimony trioxide (e.g., Zelec® ECP powders by Dupont Specialty Chemicals), and powdered metal dispersions. Carbon black is the preferred conductive material.

The binder used in the conductive finish can be any binder, resin, or latex capable of binding the conductive material to the substrate. Examples include butadiene acrylonitrile latex emulsions, carboxy-modified acrylonitrile emulsions (e.g., Hycar® 1571, 1572 by B. F. Goodrich), acrylonitrile butadiene styrene emulsions (e.g., Hycar® 1577, 1580), acrylic emulsions (e.g., Rhopex® TR407, TR934 by Rohm and Haas), polyvinyl chloride emulsions, butyl rubber emulsions, ethylene/propylene rubber emulsions, polyurethane emulsions, polyvinyl acetate emulsions (e.g., Duroset® by National Starch), SB vinyl pyridine emulsions, polyvinyl alcohol emulsions, and melamine resins (e.g., Aerotex® 3030, M-3 by Freedom Chemical). Blends of these materials, or any aqueous-based emulsions of binders, resins, or latexes, may also be used. Significantly, the ionic conductivity of the binder may secondarily contribute to the electrical conductivity of the fabric. In particular, the use of butadiene acrylonitrile latex emulsion is preferred for this reason.

Additives which exhibit ionic conductivity may also be included in the conductive coating solution to further enhance the conductivity of the fabric. These include, in general, complex anions having a high degree of dissociation, materials with high dielectric constants, polarizable materials, aromatic materials having conjugated double bonds, transition metals with full "d" orbitals (groups 10–12), and materials having sp and $sp^2$ hybridization. Specific examples of such additives are salts of sulfonic, phosphoric, or carboxylic acids wherein the hydrophobic portion contains aromatic groups (e.g., Zelec® TY, Zelec® UN by Dupont Specialty Chemicals), amine salts, amine functional coupling agents, ion exchange resins (e.g., Ionac® PE100 by Sybron), thermosetting polyamine (e.g., Aston® 123 by Rhone Poulenc, Polyquart H by Henkel), organic phosphate ester dispersant (e.g., Dextrol® OC20 by Dexter Chemical), sulfonated polystyrene (e.g., Versa® TL125 by National Starch), organosilicon (e.g., Y9567, Y9794 by Union Carbide), polyethylene glycol (e.g., Union Carbide's Carbowax® series), propylene glycol, and quaternary ammonium compounds (e.g., EMCOL CC9, EMCOL CC55 by Witco Chemical).

The process results in a flexible, electrically conductive fabric exhibiting high workability and an ASTM D-257-93 surface resistivity from 1.0 to $0.1 \times 10^{10}$ ohms per square, preferably 10 to $1.0 \times 10^{6}$ ohms per square. The conductivity can be adjusted within this range depending on the particular end use requirements. For instance, surface resistivities from 0.1×103 to $1 \times 10^{10}$ are appropriate for electrostatic dissipation or electrical grounding, surface resistivities less than $0.1 \times 10^{5}$ are generally considered electrically conductive, and surface resistivities less than $0.1 \times 10^{4}$ are useful for EMI shielding. The adjustment in surface resistivity can be achieved, for example, by including the additives described above in the conductive coating solution, altering the ratio of substrate material to conductive material, nipping the fabric to a certain amount of coating add-on, or calendering or otherwise dry finishing the substrate. Further additives may be used in the conductive coating to control rheology, viscosity, or polymer or filler content in order to meet any particular physical requirements.

The conductive fabric of the present invention retains most of the original properties of the substrate with only minor changes. The basis weight of the fabric obviously increases, along with a decrease in permeability, both due to the addition of the conductive coating. There is also a slight increase in hand. The color will change according to the additives of the aqueous solution, and the tensile strength generally remains the same or slightly increases.

When a conductive veil as described above is applied to a resin body, the cure rate of the resin is negatively effected. Thus, according to another embodiment of the present invention, a resin affecting composition, e.g., a cure promoter, may be placed on the conductive veil to aide in the formation of resin parts having conductive properties. Resin affecting compositions include but are not limited to cure promoters, mold release agents and UV stabilizers.

Cure promoter additives such as heavy metal compounds that react with compounds supplying free radicals, for example cobaltous compounds (e.g., cobalt nitrate), promote room temperature cure of resins, in general, and vinyl ester resins, in particular, with no effect on the resistivity of the fabric or the composite. This is a significant consideration because activated carbon must be heavily loaded in the fabric to achieve the requisite conductivity, and the more carbon added, the higher the cure inhibition. If a cure promoter, such as one containing cobalt, is not added to the conductive fabric, an insufficient cure may result in the portion of the composite occupied by the conductive fabric. Moreover, this addition of cure promoter has no adverse effect on the resistivity of the heavily-loaded carbon coating, which remains at 500 to 5000 ohms per square. Processes utilizing elevated temperature cures may need less cure promoter or none at all, because the high temperature may alone be enough to overcome carbon's inhibitive effect on cure.

Cure promoters for use in the present invention include an organometallic complex in a polar solvent, such as the cure promoter PEP-183S made by Air Products Inc. PEP-183S accelerates the release or disassociation of reactive-free radicals of specific catalysts used to polymerize polyester resins in the production of fiberglass reinforced plastic articles or parts. PEP-183S is a cure promoter designed to accelerate the elevated temperature cure of perococtoate, and perbenzoate catalyzed polyester molding compounds in matched die molds. PEP-183S is useful at 0.2 to 0.8 parts per hundred of the resin (by weight) with 0.4 being the most useful concentration. PEP-183S reduces the cure time of t-butyl perbenzoate catalyzed resin matrixes by 20 to 30%, depending on the resin being used and the temperature of the mold. PEP-183S will also accelerate the cure of t-butyl peroctoate catalyzed resin systems. Preferred cure promoters are selected from cobalt-containing compounds.

Preferred fabrics for use as a substrate for the treated fabrics of this invention are Nexus® and Reemay®. Nexus® is a spunlaced apertured or non-apertured polyester fabric used as a fabric in the fabrication of a fiberglass reinforced plastic (FRP) article. It is used to provide a resin-rich surface for the purpose of enhancing the appearance or improving the corrosion resistance of the finished FRP article or part.

Reemay® is a spunbonded non-apertured polyester fabric used as a fabric in the fabrication of FRP parts. It is used much the same as Nexus® to provide a resin-rich surface for the purpose of enhancing the appearance or improving the corrosion resistance of the finished FRP part.

In order to increase the speed of the pultrusion process which is restricted by the cure rate of the resin, it is necessary to increase the cure rate of the surface of the article without affecting the cure rate of the remaining mass. To accomplish this, a cure promoter, such a PEP-183S (an organometallic accelerator solution), was placed on the surface of a Nexus® fabric supplied by Precision Fabrics Group, Inc. The treated Nexus® was then run on a standard pultrusion line on the surface of the article. In order to determine if the promoter on the fabric was affecting the cure of the resin, a thermocouple wire was run just under the fabric. This wire measured the position and level of peak exotherm of the surface resin. The exotherm information was then compared to exotherm information obtained from running a thermocouple wire under a control. The results clearly showed that the addition of the cure promoter to the fabric improved the cure at the fabric-resin interface.

A preferred mold release to be used with the Nexus® and Reemay® fabrics described above is an alcohol phosphate, such as Zelec made by DuPont Chemicals. Zelec lubricates the surface of the mold and reduces the adhesion between the resin and the mold surface, thus facilitating the removal of the resin article from the mold. Other water dispersible mold release products could be used.

In one preferred embodiment, the concentration of mold release is 0.5% of the weight of resin.

The invention will be further clarified by the following examples, which are intended to be purely exemplary.

Examples 1–3 are directed to the production of conductive fabrics or veils.

EXAMPLE 1

The substrate used was a spunlaced hydroentangled apertured nonwoven 100% dacron polyester having a weight of 1.3 oz. per sq. yard (Dupont SONTARA® style 8010/PFGI style 700–00010). The pretreated fabric had an ASTM D-257-93 surface resistivity greater than $10^{14}$ ohms per square and is considered an electrical insulator.

The fabric was dipped and saturated in the following conductive coating solution:

| INGREDIENT | % SOLIDS | % WET OWB | % DRY OWB |
|---|---|---|---|
| Butadiene Acrylonitrile Latex Emulsion | 44% | 27.81 | 12.24 |
| Conductive Carbon Black Pigment | 40% | 55.62 | 22.25 |
| Water | — | 16.57 | — |
| Total | | 100.00 | 34.49 |

The fabric was then nipped through a rubber nip roll textile pad to leave 143% wet add-on, and then framed, dried, and cured through a conventional textile lab oven for a duration of 30 seconds at a temperature of 400° F.

The resulting fabric exhibited the following properties:

| | |
|---|---|
| Basis Weight: (INDA IST 130.1-92) | 2.09 oz. per sq. yd. |
| Dry Crock Rating (AATCC 8-1989) | 4.5 |
| Grab Tensile/% Elongation (4" × 7" SPECIMEN) (INDA IST 110.1-92) | MD 33#/27%<br>XD 22#/80% |
| Thickness (INDA IST 120.1-92) | 12 mils |
| Surface Resistivity (@12 and 50% RH/72° F.) (ASTM D257-93) | 1200–1500 ohms per square |
| Surface Resistance (EOS/ESD S11.11) | 120–150 ohms |

EXAMPLE 2

This fabric was prepared by a continuous textile finishing process consisting of the following steps:

The same substrate used in Example 1 was dipped and saturated in the following conductive coating solution:

| INGREDIENT | % SOLIDS | % WET OWB | % DRY OWB |
|---|---|---|---|
| Aqueous Ammonia (26%) | — | 0.23 | 0.06 |
| Anionic Electrolyte Dispersant | 25.0 | 0.35 | 0.09 |
| Anionic Leveling Surfactant | 37.5 | 0.12 | 0.05 |
| Propylene Glycol | 100.0 | 1.84 | 1.84 |
| Conductive Carbon Black Pigment | 40.0 | 28.82 | 11.53 |
| Butadiene Acrylonitrile Latex Emulsion | 44.0 | 14.41 | 6.34 |
| Anionic Deaerator/ Defoamer | 42.0 | .023 | 0.10 |
| Water | — | 54.00 | |
| Total | — | 100.0 | 20.01 |

The fabric was squeezed through rubber nip rolls to a wet pick-up of 149% to 234% based on the weight of the substrate and then fed into a tenter frame. The tentered fabric was dried and cured in a gas fired oven at 400° F. for 45 seconds. The cured fabric was then detentered and batched to the desired length.

The resulting fabric exhibited the following properties:

| | |
|---|---|
| Basis Weight: (INDA IST 130.1-92) | 1.65 to 1.85 oz./sq. yd. |
| Dry Crock Rating (AATCC 8-1989) | 3.5 rating |
| Grab Tensile/% Elongation (4" × 7" SPECIMEN) (INDA IST 110.1-92) | MD 37.0#/27%<br>XD 20.0#/106% |
| Thickness (INDA IST 120.1-92) | 13 mils to 15 mils |
| Surface Resistivity (@12 and 50% RH/72° F.) (ASTM D257-93) | 4000–4900 ohms per square |

-continued

| | |
|---|---|
| Surface Resistance (EOS/ESD S11.11) | 400–490 ohms |

EXAMPLE 3

This fabric was prepared by a continuous textile finishing process consisting of the following steps:

The substrate used was a PBN II #6/6 Nylon fiber spunbonded and print bonded nonwoven PFGI style 700-200010 (1.0 oz./sq. yd.). This material was nonconductive, exhibiting an ASTM D-257-93 surface resistivity of $1\times10^{13}$ to $1\times10^{14}$ ohms per square.

The substrate was dipped and saturated in the following conductive coating solution:

| INGREDIENT | % SOLIDS | % WET OWB | % DRY OWB |
|---|---|---|---|
| Aqueous Ammonia (26%) | — | 0.23 | 0.06 |
| Anionic Electrolyte Dispersant | 25.0 | 0.35 | 0.09 |
| Anionic Leveling Surfactant | 37.5 | 0.12 | 0.05 |
| Propylene Glycol | 100.0 | 1.84 | 1.84 |
| Conductive Carbon Black Pigment | 40.0 | 28.82 | 11.53 |
| Butadiene Acrylonitrile Latex Emulsion | 44.0 | 14.41 | 6.34 |
| Anionic Deaerator/ Defoamer | 42.0 | .023 | 0.10 |
| Water | — | 54.00 | |
| Total | — | 100.0 | 20.01 |

The fabric was squeezed through rubber nip rolls to a wet pick-up of 33% to 105% based on the weight of the substrate and then fed into a tenter frame. The tentered fabric was dried and cured in a gas fired oven at 390 to 400° F. for 45 seconds. The cured fabric was detentered and batched to the desired length.

The resulting fabric exhibited the following properties:

| | |
|---|---|
| Basis Weight: (INDA IST 130.1-92) | 1.06 to 1.19 oz./sq. yd. |
| Dry Crock Rating (AATCC 8-1989) | 3.5 rating |
| Grab Tensile/% Elongation (4" × 7" SPECIMEN) (INDA IST 110.1-92) | MD 28.0#/30% XD 18.0#/35% |
| Thickness (INDA IST 120.1-92) | 9 to 11 mils |
| Surface Resistivity (@12 and 50% RH/72° F.) (ASTM D257-93) | 22,000 to 32,000 ohms per square |
| Surface Resistance (EOS/ESD S11.11) | 2,200 to 3,200 ohms |

In addition to the method of preparing the conductive fabric described above, other methods for applying the conductive coating may be used. These include spray finishing, printing, coating with a paste or froth, or the use of frothed finish technologies or Triatex®.

The methods disclosed herein may be used to apply the conductive coating to one or both surfaces of the fibrous web substrate to attain only partial penetration of the substrate matrix. Alternatively, these methods may fully penetrate the substrate matrix with the conductive coating and thus coat the entire fibrous web.

Examples 4 and 5 are directed to conductive fabrics or veils containing resin affecting compositions.

EXAMPLE 4

This fabric was prepared by a continuous textile finishing process consisting of the following steps:

The same substrate used in Example 1 was dipped and saturated in the following conductive coating solution:

| | 1st Pass | | |
|---|---|---|---|
| INGREDIENT | % SOLIDS | % WET OWB | % DRY OWB |
| Aqueous Ammonia (26%) | — | 0.23 | 0.06 |
| Anionic Electrolyte Dispersant | 25.0 | 0.35 | 0.09 |
| Anionic Leveling Surfactant | 37.5 | 0.12 | 0.05 |
| Propylene Glycol | 100.0 | 1.84 | 1.84 |
| Conductive Carbon Black Pigment | 40.0 | 28.82 | 11.53 |
| Butadiene Acrylonitrile Latex Emulsion | 44.0 | 14.41 | 6.34 |
| Anionic Deaerator/ Defoamer | 42.0 | .023 | 0.10 |
| Water | — | 54.00 | |
| Total | — | 100.0 | 20.01 |

The fabric was squeezed through rubber nip rolls to a wet pick-up of 149% to 234% based on the weight of the substrate, and then fed into a tenter frame. The tentered fabric was dried and cured in a gas fired oven at 400° F. for seconds. The cured fabric was then detentered and subjected to a second pass.

| | 2nd Pass | | |
|---|---|---|---|
| INGREDIENT | % SOLIDS | % WET OWB | % DRY OWB |
| Cobalt Nitrate | 10% | 6.0% | 0.6% |

The fabric was squeezed through rubber nip rolls to a wet pick-up of about 160% based on the weight of the substrate and then fed into a tenter frame. The tentered frame was dried and cured in a gas fired oven at 350° F. for 30 seconds. The cured fabric was then detentered and batched to the desired length.

The resulting fabric exhibited the following properties:

| | |
|---|---|
| Basis Weight: (INDA IST 130.1-92) | 1.67–1.87 oz per sq. yd. |
| Dry Crock Rating | 3.5 |

-continued

| | |
|---|---|
| (AATCC 8-1989) | |
| Grab Tensile/% Elongation 4" × 7" SPECIMEN) (INDA IST 110.1-92) | MD 33.0#/27% XD 20.0#/106% |
| Thickness (INDA IST 120.1-92) | 13–16 mils |
| Surface Resistivity (@12 and 50% RH/72° F.) (ASTM D257-93) | 4000–4900 Ohms per square |
| Surface Resistance (EOS/ESD S11.11) | 400–490 Ohms per square |

EXAMPLE 5

This fabric was prepared by a continuous textile finishing process consisting of the following steps:

The same substrate used in Example 1 was dipped and saturated in the following conductive coating solution which also included as a cure promoter, cobalt nitrate.

| INGREDIENT | % SOLIDS | % WET OWB | % DRY OWB |
|---|---|---|---|
| Aqueous Ammonia (26%) | — | 0.23 | 0.06 |
| Anionic Electrolyte Dispersant | 25.0 | 0.35 | 0.09 |
| Anionic Leveling Surfactant | 37.5 | 0.12 | 0.05 |
| Propylene Glycol | 100.0 | 1.84 | 1.84 |
| Conductive Carbon Black Pigment | 40.0 | 28.82 | 11.53 |
| Butadiene Acrylonitrile Latex Emulsion | 44.0 | 14.41 | 6.34 |
| Anionic Deaerator/ Defoamer | 42.0 | .023 | 0.10 |
| Cobalt Nitrate | 10.0% | 5.0% | 0.5% |
| Water | — | 49.2% | — |
| Total | — | 100.0 | 20.51 |

The fabric was squeezed through rubber nip rolls to a wet pick-up of 149% to 234% based on the weight of the substrate and then fed into a tenter frame. The tentered fabric was dried and cured in a gas fired over at 400° F. for 45 seconds. The cured fabric was then detentered and batched to the desired length.

The resulting fabric exhibited the following properties:

| | |
|---|---|
| Basis Weight: (INDA IST 130.1-92) | 1.70–1.92 oz. per sq. yd. |
| Dry Crock Rating (AATCC 8-1989) | 3.5 |
| Grab Tensile/% Elongation (4" × 7" SPECIMEN) (INDA IST 110.1-92) | MD 37.0#/27% XD 20.0#/106% |
| Surface Resistivity (@12 and 50% RH/72° F.) (ASTM D257-93) | 4000–5000 Ohms per square |
| Surface Resistance (EOS/ESD S11.11) | 400–500 Ohms per square |

The principles, preferred embodiments and modes of operation of the present invention have been described in the foregoing application. The invention which is intended to be protected herein is not to be construed as limited to the particulars disclosed, since these are to be regarded as illustrative rather than restrictive. For example, it is contemplated that in addition to a cure promoter and mold release agent, other chemicals such as a fire retardant or ultraviolet stabilizer could be used in the process with the result the resin surface would possess the advantageous properties of enhanced fire retardancy and enhanced ultraviolet stabilization to light, thereby mitigating the need for the addition of these expensive chemicals in large amounts to the resin itself. Other variations and changes may be made by those skilled in the art, without departing from the spirit of the invention.

We claim:

1. A process for selectively delivering a composition effective to alter the chemical or physical properties of a resin during a production process, comprising the steps of:

(a) treating a fabric with a conductive material, a binder and a resin-affecting compound;

(b) applying the treated fabric to the resin and causing the compound to leach from the fabric into the resin;

(c) forming an article from the resin and the fabric; and (d) curing the article.

2. The process according to claim 1, wherein the resin-affecting compound is selected from a cure promoter, a mold release agent, and an ultraviolet stabilizer.

3. The process according to claim 1, wherein the fabric is applied to a surface of the resin.

4. The process according to claim 1, wherein the fabric is applied to an interior portion of the resin.

5. The process according to claim 1, wherein the fabric is treated by (1) dipping the fabric into an aqueous solution comprising the conductive material, the binder and the resin-affecting compound; (2) nipping the fabric; and (3) drying the fabric.

6. The process according to claim 1, wherein the fabric is treated by (1) applying to the fabric an aqueous solution comprising the conductive material and the binder; (2) saturating the fabric with the aqueous solution; (3) drying and curing the fabric; (4) dipping the fabric containing the conductive material and the binder into a solution comprising the resin-affecting compound; (5) nipping the fabric; and (6) drying the fabric.

7. The process according to claim 6, wherein the step of applying to the fabric the aqueous solution consists of:

dipping the fabric into the aqueous solution and nipping the fabric to a predetermined wet add-on.

8. The process according to claim 2, wherein the cure promoter is an organometallic complex in a polar solvent.

9. The process according to claim 2, wherein the cure promoter is a heavy metal compound that reacts with compounds supplying free radicals.

10. The process according to claim 9, wherein the cure promoter is a cobaltous compound.

11. The process according to claim 10, wherein the cure promoter is cobalt nitrate.

12. The process according to claim 1, wherein said conductive material consists of one or more materials selected from the group consisting of carbon black, jet black, carbonized acrylonitrile black, dry powdered carbon, tin-doped antimony trioxide, and powdered metal dispersions.

13. The process according to claim 1, wherein the process of applying the treated fabric is selected from the group consisting of pultrusion, contact molding, open molding, resin transfer molding, reaction injection molding, compression molding, and continuous panel processes.

14. The process according to claim 1, wherein the fabric is a material selected from the group consisting of polyester, nylon, glass, aramid, and rayon.

15. The process according to claim 14, wherein the fabric is selected from the group consisting of woven and non-woven.

16. The process according to claim 1, wherein the resin is selected from the group consisting of polyester resin, epoxy resin, vinyl ester resin, and phenolic resin.

17. The process according to claim 1, wherein the cure promoting compound, conductive material, and binder fully penetrate the fabric.

18. The process according to claim 1, wherein the cure promoting compound, conductive material, and binder partially penetrate the fabric.

* * * * *